United States Patent [19]

Ikegaya et al.

[11] Patent Number: 5,277,942
[45] Date of Patent: Jan. 11, 1994

[54] INSULATING MEMBER AND ELECTRIC PARTS USING THE SAME

[75] Inventors: Akihiko Ikegaya; Naoji Fujimori; Tetsuo Yashiki, all of Itami; Tetsuya Abe; Yoshio Murakami, both of Naka, all of Japan

[73] Assignees: Sumitomo Electric Industries, Ltd., Osaka; Japan Atomic Energy Research Institute, Tokyo, both of Japan

[21] Appl. No.: 775,092

[22] Filed: Oct. 11, 1991

[30] Foreign Application Priority Data

Oct. 12, 1990 [JP] Japan .................. 2-274334

[51] Int. Cl.$^5$ .................. B32B 15/04
[52] U.S. Cl. .................. 428/332; 428/469; 428/472; 428/621; 428/627; 428/632; 428/698; 428/701; 428/702; 428/704
[58] Field of Search .......... 428/621, 627, 632, 698, 428/701, 472, 469, 336, 335, 704, 332; 228/122, 120

[56] References Cited

U.S. PATENT DOCUMENTS

| 2,800,710 | 7/1957 | Dunn | 228/122 |
| 4,532,190 | 7/1985 | Kanabe et al. | 428/632 |
| 4,624,404 | 11/1986 | Ohmae et al. | 228/188 |
| 4,645,115 | 2/1987 | Kamigaito et al. | 228/122 |
| 4,740,429 | 4/1988 | Tsuno | 428/627 |
| 4,763,828 | 8/1988 | Fukaya et al. | 228/124 |
| 4,981,761 | 1/1991 | Ookouchi et al. | 428/671 |

FOREIGN PATENT DOCUMENTS 60-231472 10/1985 Japan .

OTHER PUBLICATIONS

Otsuka et al., "Interfacial Bond Strength in Alumina Ceramics Metallized and Cofired with Tungsten" Ceramic Bulletin vol. 60 (1981) May No. 5 pp. 540-545.
Dunn et al., "Analytical and Experimental Evaluation of Joining Silicon Nitride to Metal and Silicon Carbide to Metal" Society of Automotive Eng. Inc. Oct. 24-27, 1988.

Primary Examiner—A. A. Turner
Attorney, Agent, or Firm—Wenderoth, Lind & Ponack

[57] ABSTRACT

An insulating member has an insulating layer in the form of a thin ceramic plate made of at least one of SiC, $Si_3N_4$, AlN and $Al_2O_3$ ad having a thickness not less than 0.1 mm and not more than 2.0 mm, and cushioning layers provided on both sides of the insulating layer through brazing alloy for relieving thermal stress. An electric part can be made of such an insulating member. The insulating member is disposed between a conductive substrate and a conductive member and brazed thereto.

11 Claims, 2 Drawing Sheets

INSULATING MEMBER AND ELECTRIC PARTS USING THE SAME This invention relates to an insulating member which can be used in harsh environment such as high-temperature, high-voltage, high-temperature-gradient or high-impact-load, e.g. in a vacuum container for high-temperature plasma, and also to an electric part employing the insulating member for insulation.

BACKGROUND OF THE INVENTION

In a Tokamak type plasma seal-off device, a diverter is used which is adapted to produce a magnetic line of force to direct the escaping plasma to an exhaust portion (pump) without hitting directly against the nearby wall and thus to reduce impurities in the plasma. During normal operating conditions or during disruption (phenomenon where the structure of plasma changes rapidly or disrupts sometimes), the diverter is subjected to harsh thermal stress, particle load and electromagnetic force. The diverter is fixed to a water-cooled cooling member to remove heat. The cooling member is supported on the inner wall of a vacuum container and insulated therefrom. One application of the insulating member according to the present invention is to provide insulation between the cooling member for supporting and cooling the diverter and the inner wall of the vacuum container.

Heretofore, earthenware, porcelain (insulator), bakelite, mica, plastics and rubber have been used as insulating members. Such an insulating member is placed between a substrate and a conductive material and they are brought together by fastening, bonding, soldering or fitting, to form an electric part. In normal conditions, such an electric part reveals desired insulation properties.

But if such an electric part is used in harsh conditions such as high-temperature, high-voltage and high-temperature-gradient in a limited space where it is subjected to impact load, e.g. in a vacuum container for high-temperature plasma, it is required to have high heat resistance, good insulation properties, and high thermal shock resistance and good shock resistance. It is required to have a dielectric strength of 1 KV or higher and a heat resistance of 600° C. or higher. It is further required that it take up less space.

In order to meet all these requirements, it is difficult to use any of conventional insulating members for the following reasons:

1) Insulators made of earthenware or ceramics have to be fastened in position with bolts and nuts or the like. Thus, the entire device tends to be large in size. If bonded by brazing, such an insulator is liable to crack or peel due to a difference in thermal expansion coefficient between itself and the substrate metal. Further, since such an insulator has generally a low thermal conductivity, it cannot withstand a sharp temperature gradient. Moreover, due to its hardness and brittleness, it cannot be used at a location where impact load acts.

2) Bakelite, plastics and rubber have such low heat resistance that they cannot be used in any environment where the temperature exceeds 200° C. continuously. Also, in a vacuum condition, gas discharge will be inevitable.

3) Mica has a high heat resistance and good insulating properties. But its strength is low due to its cleaving characteristics.

BRIEF SUMMARY OF THE INVENTION

It is an object of this invention to provide an insulating member which can be used in harsh conditions such as high-temperature, high-voltage, high-temperature-gradient and impact shock and to provide an electric part using the insulating member.

In accordance with the present invention, there is provided an insulating member having an insulating layer in the form of a thin ceramic plate, the plate being made of at least one selected from the group consisting of SiC, $Si_3N_4$, AlN and $Al_2O_3$ and having a thickness of not less than 0.1 mm and not more than 2.0 mm, and cushioning layers brazed on both sides of the insulating layer through brazing alloy for relieving thermal stress.

From another aspect of the present invention, there is provided an electric part comprising the abovesaid insulating member disposed between a conductive substrate and a conductive member and brazed therewith.

The insulating member according to the present invention and the electric part using the insulating member have excellent heat resistance, insulation properties, resistance to temperature changes and mechanical strength and have a small volume. They are suited for use in such an environment as in a vacuum container for high-temperature plasma.

BRIEF DESCRIPTION OF THE DRAWINGS

Other features and objects of the present invention will become apparent from the following description taken with reference to the accompanying drawings, in which.

DETAILED DESCRIPTION

Figure 1:
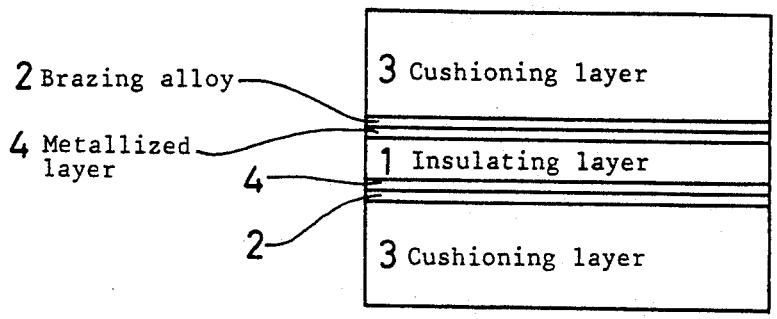
FIG. 1 is a schematic view showing the structure of the insulating member according to this invention.

As shown in FIG. 1, the insulating member according to the present invention comprises an insulating layer 1 in the form of a thin ceramic plate and a pair of thermal stress relieving layers 3 brazed to both sides of the insulating layer 1 through brazing alloy 2.

The ceramic material forming the insulating layer 1 may be at least one selected from the group consisting of SiC, $Si_3N_4$, AlN and $Al_2O_3$. Its thickness should be not less than 0.1 mm and not more than 2.0 mm. If a high thermal conductivity is required, AlN and SiC are preferable. If a high mechanical strength is required, SiC and/or $Si_3N_4$ are preferable. For lower end product cost, $Al_2O_3$ is preferable.

If the ceramic layer is too thin, it can break soon and handling is difficult. It should be at least 0.1 mm thick. If too thick, the material cost and thus the end product cost would increase. Thus, its thickness should be not more than 2.0 mm. $Al_2O_3$, though inexpensive, has a poor thermal conductivity. Thus, its thickness should preferably be not more than 0.5 mm.

If the single insulating layer 1 should suffer dielectric breakdown, its insulating function would be lost. In order to prevent this, it may be preferable, though depending on application, to provide two or more insulating layers.

In FIG. 1, numeral 4 designates a metallized layer provided on both sides of the insulating layer 1 to improve the wettability of the brazing alloy 2.

Figure 2:
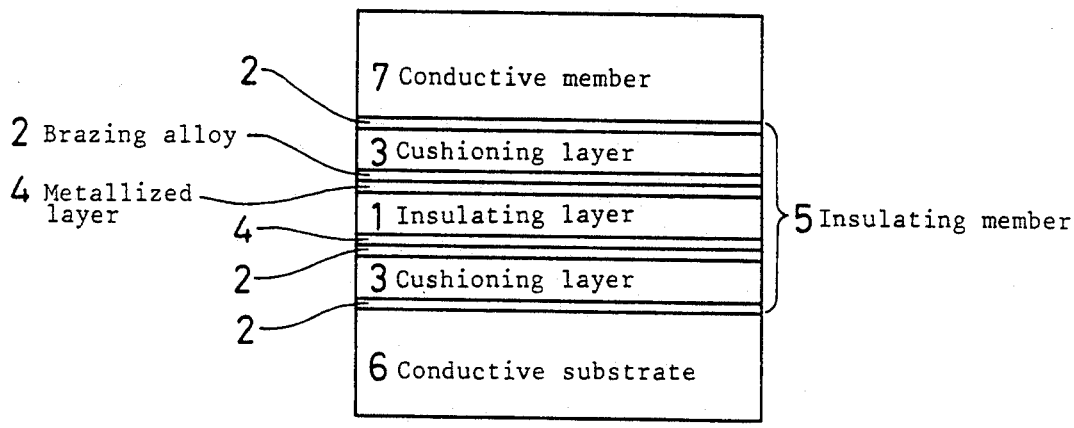
FIG. 2 is a schematic view showing the structure of the electric part according to this invention.

FIG. 2 shows an electric part according to the present invention. It comprises the insulating member 5 shown in FIG. 1 and a conductive substrate 6 and a conductive member 7 brazed to both sides of the insulating member 5 through brazing alloy 2.

FIRST EMBODIMENT

Figure 3:
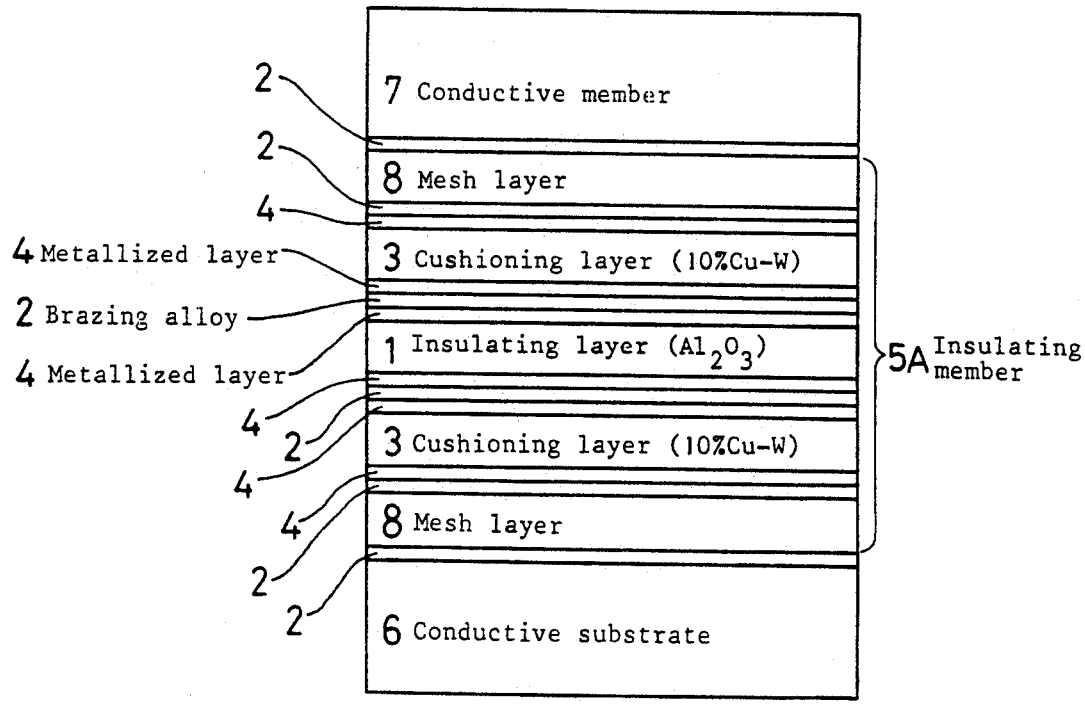
FIG. 3 is a schematic view of the first embodiment of an electric part.

In the embodiment shown in FIG. 3, an electric part comprises a conductive substrate 6 of an austenite stainless steel, an insulating member 5A brazed thereto through a brazing alloy 2 and a conductive member 7 such as a copper electrode brazed to the insulating member 5A through a brazing alloy 2.

The insulating member 5A comprises an insulating layer 1 in the form of a 0.5 mm thick plate made by sintering $Al_2O_3$ ceramics, metallized layers 4 provided at both sides of the insulating layer 1, 0.8 mm thick cushioning layers 3 made of 10% Cu-W alloy and brazed to the metallized layer 4 through brazing alloy 2, and copper mesh layers 8 having a mesh size of 42 mesh (under new JIS, 355 microns) and brazed to the cushioning layers 3 through metallized layers 4 and brazing alloy 2.

The electric part of this embodiment has a dielectric breakdown voltage of 4.1 KV, a flexural strength of 20 Kg/mm$^2$, and a heat resistance of 600 C.

The mesh may be made of iron, stainless steel, copper, nickel or monel but most preferably copper or nickel because of their good wettability with a brazing alloy in vacuum brazing. As a cushioning material, copper is preferable to nickel in deformability. If there is a large difference in linear expansion coefficient, copper can be brazed more easily than nickel. But as to the bonding strength, nickel is preferable to copper.

The larger the mesh size, the smaller the bond area at the bonding interface and thus the better the function as a cushioning material but the less the bonding strength and the thermal conductivity.

The mesh may be formed by plain weave, twilled weave, plain Dutch weave or twilled Dutch weave. Twilled weave can produce a wire gauze having a comparatively high mesh and substantially uniform in wire diameter and open lap, which is difficult with the plain weave. Twilled Dutch weave can produce a wire gauze having a large wire diameter and a fine mesh. With the twilled Dutch weave, supposing that the wire diameter is the same, the twilled Dutch weave can produce a gauze up to twice as fine in mesh as with plain weave. A gauze made by plain weave is effective as a cushioning member due to its deformability. But if the thermal conductivity and bonding strength are important, twilled Dutch weave, plain Dutch weave and twilled weave are advantageous in this order because the bonding area is larger.

If woven by plain weave, the mesh size of a cushioning member should preferably be 16-100 mesh (under new JIS: 1 mm-150 microns) When weaving nickel by plain weave, the mesh size should preferably be 12-60 mesh (under new JIS: 1.4 mm-250 microns).

To obtain a good bonding portion free of such defects as voids and oxides, brazing should be done under vacuum. To obtain a heat resistance of 600° C. or more, it is preferable to select a brazing alloy which can be used in vacuum brazing and has a melting point of 800° C. or more. Brazing should be carried out at 850° C. or higher. In vacuum brazing, a brazing alloy in the form of a foil several tens of microns to several hundreds of microns thick is interposed between the bonding interfaces and is pressed by a jig from the direction perpendicular to be bonding surfaces.

SECOND EMBODIMENT

Figure 4:
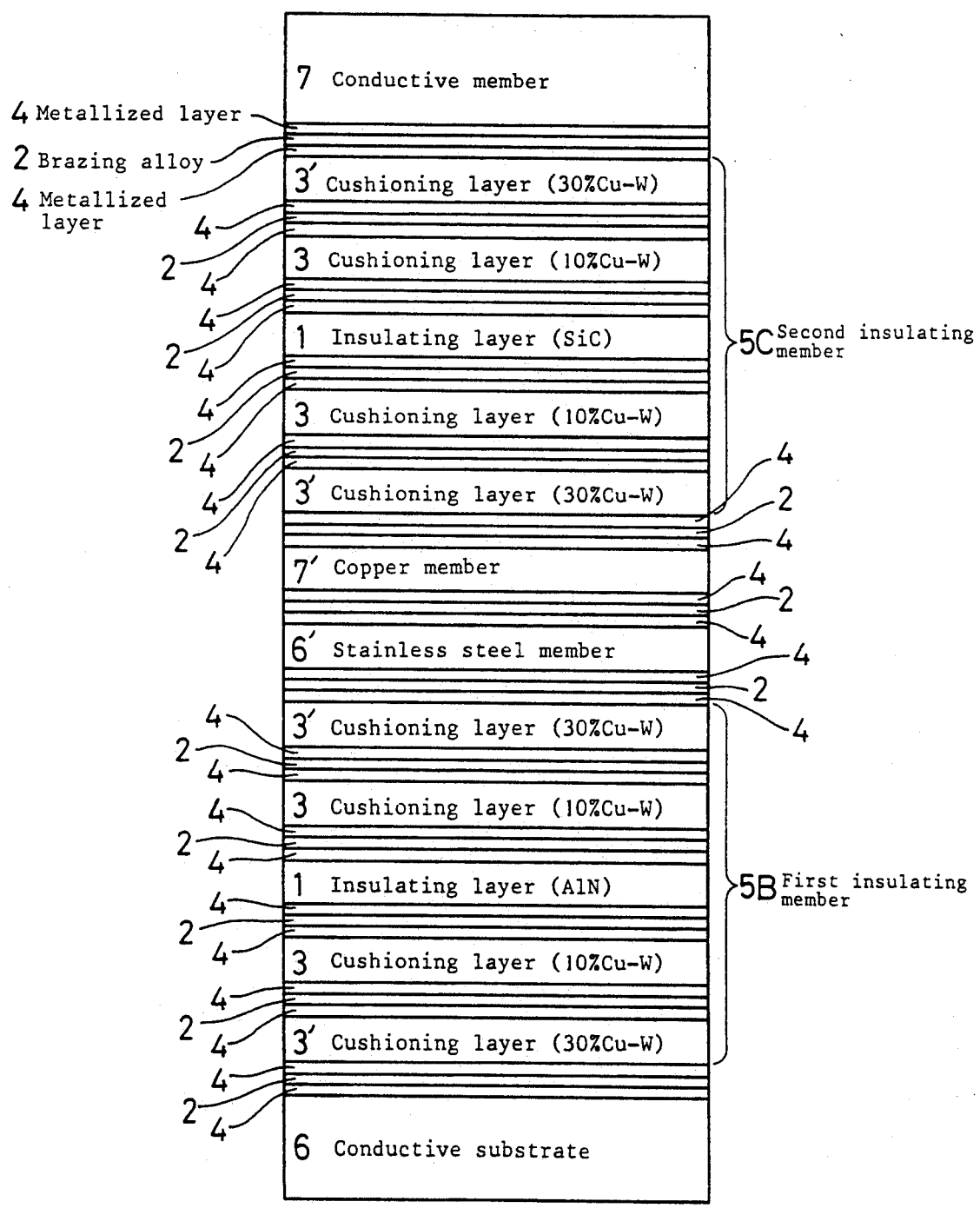
FIG. 4 is a schematic view of the second embodiment of an electric part.

In the second embodiment shown in FIG. 4, an electric part comprises a conductive substrate 6 made of an austenite stainless steel and a conductive member 7 made of copper, which are brazed together with insulating members 5B and 5C sandwiched therebetween. For higher reliability of insulation, there are provided two insulating members, a first insulating member 5B adjacent the conductive substrate 6 and a second insulating member 5C adjacent the conductive member 7. The first insulating member 5B is disposed between the substrate 6 and a member 6' made of the same stainless steel as the substrate 6. The second insulating member 5C is disposed between the conductive member 7 and a member 7' made of the same copper material as the member 7. By disposing each of the insulation members 5B and 5C between members made of the same material, the electric part can be assembled easily.

The first insulating member 5B has an insulating layer 1 made by sintering AlN, which has a high thermal conductivity, and provided on both sides thereof with metallized layers 4. In order to relieve thermal stress applied when brazing the insulating layer 1 sandwiched between the stainless steel substrate 6 and the stainless steel member 6', cushioning layers 3 and 3' are provided on both sides of the insulating layer 1. The inner cushioning layers 3 are made of a 10% Cu-W alloy which has a linear expansion coefficient $\alpha = 6.0 \times 10^{-6}$ deg$^{-1}$, which is larger than the linear expansion coefficient of AlN ($\alpha = 4.4 \times 10^{-6}$ deg$^{-1}$) and smaller than that of stainless steel ($\alpha = 16 \times 10^{-6}$ deg$^{-1}$). The outer cushioning layers 3' are made of a 30% Cu-W alloy ($\alpha = 10.2 \times 10^{-6}$ deg$^{-1}$).

The cushioning layers 3 and 3' are provided on both sides thereof with metallized layers 4.

As described above, the first insulating member 5B is made up of the insulating layer 1 and the inner and outer cushioning layers 3 and 3', all having the metallized layers 4 on both sides thereof and all brazed to one another through brazing alloy 2.

The first insulating member 5B is brazed through a brazing alloy 2 to the metallized layer 4 formed on the substrate 6 and through another brazing alloy 2 to the metallized layer 4 formed on the stainless steel member 6'.

The second insulating member 5C has an insulating layer 1 made of sintered SiC, which has a high thermal conductivity. In order to relieve thermal stress, it is provided at both sides thereof with inner cushioning layers 3 made of a 10% Cu-W alloy, which has a linear expansion coefficient larger than that of SiC ($\alpha = 3.8 \times 10^{-6}$ deg$^{-1}$) and outer cushioning layers 3' made of a 30% Cu-W alloy.

The second insulating member 5C is the same as the first insulating member 5B in that the insulating layer 1 and the cushioning layers 3 and 3' are all provided on both sides thereof with metallized layers 4 and they are brazed together through brazing alloy 2. They also have similar structures in that metallized layers 4 are provided on the conductive member 7 and the copper member 7', which are brazed to the second insulating member 5C through brazing alloy 2. The metallized layers 4 may be omitted when members to be brazed have good wettability with the brazing alloy.

The members at the side of the conductive substrate 6 and the members at the side of the conductive member 7 may be manufactured separately, metallized layers 4 be formed on the stainless steel member 6' and the copper member 7', and these members 6' and 7' be then brazed together through brazing alloy 2 at a temperature where the alloy used to form the insulating members 5B and 5C will not melt.

The electric part according to the present invention has a dielectric breakdown voltage of 5.5 KV, a flexural strength of 30 kg/mm, and a heat resistance of 650° C.

What is claimed is:

1. An insulating member comprising an insulating layer in the form of a thin ceramic plate, said plate being made of at least one selected from the group consisting of SiC, $Si_3N_4$, AlN, and $Al_2O_3$ and having a thickness of not less than 0.1 mm and not more than 2.0 mm, and cushioning layers brazed on both sides of said insulating layer through a brazing alloy for relieving thermal stress, characterized in that said cushioning layers contain a Cu-W alloy and a mesh made of at least one selected from the group consisting of iron, stainless steel, copper, nickel and monel.

2. An insulating member as claimed in claim 1 wherein said Cu-W alloy contained in said cushioning layers contains substantially 10-30% of Cu.

3. An insulating member comprising an insulating layer in the form of a thin ceramic plate, said plate being made of at least one member selected from the group consisting of SiC, $Si_3N_4$, AlN, and $Al_2O_3$ and having a thickness of not less than 0.1 mm and not more than 2.0 mm, and cushioning layers brazed on both sides of said insulating layer through a brazing alloy for relieving thermal stress, characterized in that said cushioning layers comprise a first cushioning layer and a second cushioning layer, said first and second cushioning layers containing a Cu-W alloy and a mesh made of at least one selected from the group consisting of iron, stainless steel, copper, nickel and monel.

4. An insulating member as claimed in claim 3 wherein said Cu-W alloy contained in said first and second cushioning layers contains substantially 10-30% Cu.

5. An electric part comprising a conductive substrate, a conductive member and an insulating member, said conductive substrate and said conductive member being made of at least one metal selected from the group consisting of copper and stainless steel, said insulating member comprising an insulating layer in the form of a thin ceramic plate, said plate being made of at least one member selected from the group consisting of SiC, $Si_3N_4$, AlN, and $Al_2O_3$ and having a thickness of not less than 0.1 mm and not more than 2.0 mm, and cushioning layers brazed on both sides of said insulating layer through a brazing alloy for relieving thermal stress, said cushioning layers contain a Cu-W alloy and a mesh made of at least one member selected from the group consisting of iron, stainless steel, copper, nickel and monel.

6. An electric part as claimed in claim 5 wherein said Cu-W alloy contained in said cushioning layers contains substantially 10-30% Cu.

7. An electric part comprising a conductive substrate, two conductive members and two insulating members sandwiched, respectively, between said conductive substrate and one of said two conductive members and between said two conductive members, said conductive substrate and said conductive members being made of at least one metal selected from the group consisting of copper and stainless steel, said each insulating member comprising an insulating layer in the form of a thin ceramic plate, said plate being made of at least one selected from the group consisting of SiC, $Si_3N_4$, AlN, and $Al_2O_3$ and having a thickness of not less than 0.1 mm and not more than 2.0 mm, and cushioning layers brazed on both sides of said insulating layer through a brazing alloy for relieving thermal stress, said cushioning layers comprising a first cushioning layer and a second cushioning layer, each of said first and second cushioning layers containing a Cu-W alloy and a mesh made of at least one selected from the group consisting of iron, stainless steel, copper, nickel and monel.

8. An electric part as claimed in claim 7 wherein said Cu-W alloy contained in said first and second cushioning layers contains substantially 10-30% Cu.

9. An insulating member as claimed in claim 1 or 5 wherein said mesh has a mesh size of 16-100 mesh.

10. An insulating member as in claims 1, 3, 5 and 7 wherein the Cu-W alloy in the cushioning layers contains 10% of Cu.

11. An insulating member as in claims 1, 3, 5 and 7 wherein the Cu-W alloy in the cushioning layers contains 30% of Cu.

* * * * *